United States Patent
Ho et al.

(10) Patent No.: US 8,130,813 B1
(45) Date of Patent: Mar. 6, 2012

(54) METHOD AND APPARATUS FOR ALLOCATING A BEACON SIGNAL IN A WIRELESS COMMUNICATION NETWORK

(75) Inventors: Ming-Ju Ho, Alpharetta, GA (US); Ali Jabbary, Roswell, GA (US); Ramzi Barghouthi, Atlanta, GA (US)

(73) Assignee: AT & T Mobility II LLC, Atlanta, GA (US)

( * ) Notice: Subject to any disclaimer, the term of this patent is extended or adjusted under 35 U.S.C. 154(b) by 765 days.

(21) Appl. No.: 12/113,396

(22) Filed: May 1, 2008

Related U.S. Application Data

(62) Division of application No. 10/973,623, filed on Oct. 26, 2004, now Pat. No. 7,385,953.

(51) Int. Cl.
*H04B 1/00* (2006.01)

(52) U.S. Cl. ......... 375/138; 370/330; 455/434; 455/515

(58) Field of Classification Search ........... 370/330, 370/336, 345; 455/434, 515; 375/130, 132, 375/138
See application file for complete search history.

(56) References Cited

U.S. PATENT DOCUMENTS

| | | | |
|---|---|---|---|
| 6,104,930 A * | 8/2000 | Ward et al. ............... 455/450 |
| 6,647,000 B1 | 11/2003 | Persson et al. | |
| 6,928,283 B2 * | 8/2005 | Rudolf ...................... 455/434 |
| 7,092,353 B2 | 8/2006 | Laroia et al. | |
| 7,162,250 B2 * | 1/2007 | Misra ........................ 455/453 |
| 7,212,821 B2 * | 5/2007 | Laroia et ................... 455/437 |
| 2002/0086675 A1 * | 7/2002 | Mansour .................... 455/442 |
| 2004/0058712 A1 | 3/2004 | Rudolf | |
| 2004/0095902 A1 | 5/2004 | Laroia et al. | |
| 2004/0109432 A1 | 6/2004 | Laroia et al. | |
| 2004/0228305 A1 * | 11/2004 | Grieco ....................... 370/335 |
| 2005/0124345 A1 | 6/2005 | Laroia et al. | |
| 2005/0233715 A1 | 10/2005 | Laroia et al. | |
| 2005/0233736 A1 | 10/2005 | Berstis et al. | |
| 2006/0089141 A1 | 4/2006 | Ho et al. | |

* cited by examiner

*Primary Examiner* — Chi Pham
*Assistant Examiner* — Weibin Huang

(57) ABSTRACT

A method and apparatus for transmitting beacon signals in a wireless communications network. For a given cell site, a single frequency may be used for the beacon signal by assigning different beacon signal time slots to different sectors of the cell site. During one time slot, the beacon signal is transmitted to one of the sectors, and during another one of the time slots, the beacon signal is transmitted to a different one of the sectors. Because a single frequency can be used for all of the sectors of a cell site, more frequencies are available for other purposes, such as for user traffic, for example. The invention improves spectral efficiency, reduces adjacent channel interference and co-channel interference and allows power consumption to be controlled.

13 Claims, 7 Drawing Sheets

| TIME SLOT | $t_0$ | $t_1$ | $t_2$ | $t_3$ | $t_4$ | $t_5$ | $t_6$ | $t_7$ |
|---|---|---|---|---|---|---|---|---|
| FRAME 1 | α | β | γ | α | β | γ | α | β |
| FRAME 2 | β | γ | α | β | γ | α | β | γ |
| FRAME 3 | γ | α | β | γ | α | β | γ | α |

*FIG. 7*

| TIME SLOT | $t_0$ | $t_1$ | $t_2$ | $t_3$ | $t_4$ | $t_5$ | $t_6$ | $t_7$ |
|---|---|---|---|---|---|---|---|---|
| FRAME 1 | α | β | γ | β | α | γ | β | α |
| FRAME 2 | γ | α | β | γ | β | α | γ | β |
| FRAME 3 | β | γ | α | α | γ | β | α | γ |

*FIG. 8*

METHOD AND APPARATUS FOR ALLOCATING A BEACON SIGNAL IN A WIRELESS COMMUNICATION NETWORK

CROSS REFERENCE TO RELATED APPLICATION

This application is a divisional application of pending U.S. application Ser. No. 10/973,623, filed on Oct. 26, 2004, which is hereby incorporated by reference for all purposes.

BACKGROUND OF THE INVENTION

1. Field of Invention

The invention relates to communications networks and, more particularly, to a method and apparatus for allocating beacon signals in a communications network.

2. Description of Related Art

In wireless communications networks, beacon signals, which are sometimes also referred to as pilot signals, are broadcast over the airwaves to enable mobile devices to search for cell sites that are handoff candidates. Generally, one beacon signal is required for each sector of each cell site and each beacon signal of a given cell site uses a different frequency. FIG. 1 is a diagram of a plurality of cell sites, each of which is divided into three sectors with each sector of a given cell site using a different frequency. The frequencies that are allocated for use as beacon signals for the network are frequencies $f_1$ through $f_{12}$. For cell site 1, which is shown in block diagram form in FIG. 2, the beacon signal for sector α uses frequency $f_1$ and is broadcast over the sector by directional antenna 11. The beacon signal for sector β uses frequency $f_2$ and is broadcast over the sector by directional antenna 12. The beacon signal for sector γ uses frequency $f_3$ and is broadcast over the sector by directional antenna 13. The next adjacent cell site 2 uses frequency $f_4$ for sector α, frequency $f_5$ for sector β and frequency $f_6$ for sector γ. The next adjacent cell site 3 uses frequency $f_7$ for sector α, frequency $f_8$ for sector β and frequency $f_9$ for sector γ. The next adjacent cell site 4 uses frequency $f_{10}$ for sector α, frequency $f_{11}$ for sector β and frequency $f_{12}$ for sector γ.

After frequencies $f_1$ through $f_{12}$ have been used for the beacon signals for cell sites 1 through 4, those frequencies are then reused in non-adjacent cells. For example, cell site 1, which uses frequencies $f_1$ through $f_3$ for the beacon signals is separated from cell site 5, which also uses frequencies $f_1$ through $f_3$ for the beacons signals, by cell site 4, which uses frequencies $f_{10}$ through $f_{12}$ for the beacons signals. As the number of frequencies used for the beacon signals increases, the possibility that co-channel interference will occur decreases. However, increasing the number of frequencies that are reserved for the beacon signals decreases the number of frequencies that can be used for caller traffic. Therefore, with the current beacon signal allocation scheme, a tradeoff exists between spectral efficiency and co-channel interference.

It can be seen from FIG. 1 that each cell site uses three different frequencies for the beacon signals and that the beacon signal frequencies are reused after twelve frequencies have been used. After frequencies $f_1$ through $f_{12}$ have been used for the beacon signals for cell sites 1 through 4, those frequencies are then reused in non-adjacent cells. For example, cell site 1, which uses frequencies $f_1$ through $f_3$ for the beacon signals is separated from cell site 5, which also uses frequencies $f_1$ through $f_3$ for the beacons signals, by cell site 4, which uses frequencies $f_{10}$ through $f_{12}$ for the beacons signals. Therefore, in the beacon signal frequency allocation scheme shown in FIG. 1, twelve frequencies are allocated to four cell sites. This is commonly referred to as a 4/12 beacon signal allocation configuration, where X=4 corresponds to the number of cell sites that use a given frequency before the frequency is reused and Y=12 corresponds to the total number of frequencies used. Other beacon signal frequency allocation schemes that are common are 5/15 and 7/21.

FIG. 2 is a functional block diagram of cell site 1 shown in FIG. 1. As shown in FIG. 2, the user frequencies start at frequency $f_{13}$ because frequencies $f_1$ through $f_{12}$ are reserved for the beacon signals. For exemplary purposes, FIG. 2 depicts only three frequencies ($f_{13}$ through $f_{15}$) being used for caller traffic and the same user frequencies being used for caller traffic for all of the sectors. The beacon signals are continuously broadcast by the base stations of the cell sites at constant power so that the mobile devices are able to easily detect the beacon signals. In order to avoid interference, the frequencies that are used for the beacon signals are not used for caller traffic. Typically, frequency hopping is used so that the same frequency is not being transmitted at the same time in two sectors of the same cell site. For example, if user frequencies $f_{13}$ and $f_{14}$ are being transmitted over sector α by antenna 11 in time slots $t_1$ and $t_2$, respectively, user frequencies $f_{14}$ and $f_{13}$ may be transmitted over sector β by antenna 12 in time slots $t_1$ and $t_2$, respectively, but not in time slots $t_2$ and $t_1$, respectively.

A signal combining and distribution unit 10 receives the beacon signals generated by beacon logic 14 and caller traffic signals generated by caller traffic logic 15. The signal combining and distribution unit 10 combines the beacon and caller traffic signals for broadcasting by the respective antennas 11, 12 and 13 over the respective sectors, α, β and γ. The beacon signals are normally broadcast in time slot $t_1$ of a Broadcast Common Control Channel (BCCH) frame that is made up of eight time slots of equal duration, $t_1$ through $t_8$. For this reason, the beacon logic 14 is referred to herein as BCCH logic.

FIG. 3 depicts a BCCH frame 21. The first time slot, which corresponds to $t_1$, is reserved for transmission of BCCH information, which includes the beacon signal. Time slots $t_2$ through $t_8$ can be used to transmit information other than BCCH information, including caller traffic. However, even when there is no caller traffic, all eight time slots $t_1$ through $t_8$ are transmitted so that mobile devices can detect the beacon signal. In order to ensure that mobile devices can easily detect the beacon signal, the BCCH frame 21 is continuously broadcast.

One of the disadvantages of allocating beacon signals in the manner described above with reference to FIGS. 1-3 is that a relatively large number of frequencies must be reserved for use as beacon signals, which reduces the spectral efficiency of the network. For example, with respect to the configuration shown in FIG. 1, twelve frequencies are reserved for the beacon signals. If these frequencies were not reserved for use as beacon signals, they could be used for other purposes, such as caller traffic, which would allow each cell site to service more calls. Therefore, allocating a large number of frequencies for use as the beacon signals reduces the number of calls that can be handled by each cell site, thereby reducing network coverage and increasing overall network costs.

Another disadvantage of the current beacon signal allocation scheme is that transmission of the BCCH frame even when there is no caller traffic is inefficient in terms of power consumption. In addition, because the first time slot $t_1$ is reserved for transmission of the BCCH frame, the first time slot cannot be used for other purposes, such as for caller traffic. For this additional reason, the current scheme of beacon signal frequency allocation is not spectrally efficient.

Another disadvantage of the current beacon signal allocation scheme is that it requires time consuming and tedious frequency planning to ensure that all BCCH channels in the same cell site have sufficient frequency separation to avoid adjacent channel interference impact (i.e., interference between the signals in adjacent sectors of the same cell site). In addition, sufficient distance separation is necessary to reduce co-channel interference. As shown in FIG. 1, cell sites that use the same frequencies for the beacon channels are not located adjacent one another, but are separated by some distance. This is because co-channel interference will result if cell sites that use the same frequencies are located adjacent one another. The frequencies used for the beacon signals and the locations of the cell sites are chosen so that co-channel interference is reduced to acceptable levels.

Accordingly, a need exists for a method and apparatus for beacon signal allocation that provide a spectrally efficient way of performing beacon signal allocation that is also efficient in terms of power consumption.

SUMMARY OF THE INVENTION

In accordance with the present invention, a method and apparatus are provided for transmitting beacon signals in a wireless communications network. For a given cell site, a single frequency may be used for the beacon signal by assigning different beacon signal time slots to different sectors of the cell site. During one time slot, the beacon signal is transmitted to one of the sectors, and during another one of the time slots, the beacon signal is transmitted to a different one of the sectors. Because a single frequency can be used for all of the sectors of a cell site, more frequencies are available for use for user traffic. Therefore, the invention improves spectral efficiency. In addition, because a lesser number of frequencies are needed for the beacon signals, adjacent channel interference and co-channel interference are reduced. Also, time slots for the beacon signals can be allocated to the sectors in any desired manner. This allows time slots that are not being used for beacon signals to be used for other purposes, such as for caller traffic, for example, which further improves spectral efficiency. Time slots can also be allocated in a way that allows power consumption to be controller. For example, in a sector where there is very little caller traffic, less beacon signal time slots can be allocated, which reduces power consumption.

In accordance with one embodiment, the apparatus of the invention comprises beacon signal logic configured to allocate at least a first beacon signal time slot $t_1$ to at least the first sector $\alpha$, and a transmitter that transmits a first beacon signal on a first beacon signal frequency $f_1$ over the first sector $\alpha$ during the first beacon signal time slot $t_1$.

In accordance with another embodiment, the apparatus comprises beacon signal logic and a transmitter. The beacon signal logic is configured to allocate at least a first beacon signal time slot $t_1$ to the first sector $\alpha$, a second beacon signal time slot $t_2$ to the second sector $\beta$, and a third beacon signal time slot $t_3$ to the third sector $\gamma$. The transmitter transmits a first beacon signal on a first beacon signal frequency $f_1$ over the first sector $\alpha$ during time slot $t_1$, a second beacon signal on the first beacon signal frequency $f_1$ over the second sector $\beta$ during the second time slot $t_2$, and a third beacon signal on the first beacon signal frequency $f_1$ over the first sector $\gamma$ during the third time slot $t_3$. Time slot $t_2$ occurs later in time than time slot $t_1$ and time slot $t_3$ occurs later in time than time slot $t_2$.

In accordance with another embodiment, the apparatus comprises beacon signal logic configured to sequentially allocate beacon signal time slots to the first sector $\alpha$, the second sector $\beta$ and the third sector $\gamma$, and a transmitter that transmits beacon signals on a first beacon signal frequency $f_1$ over the first sector $\alpha$, the second sector $\beta$ and the third sector $\gamma$ during respective time slots. When the beacon signal is being transmitted over sector $\alpha$, the beacon signal is not being transmitted over sectors $\beta$ or $\gamma$. When the beacon signal is being transmitted over sector $\beta$, the beacon signal is not being transmitted over sectors $\alpha$ or $\gamma$. When the beacon signal is being transmitted over sector $\gamma$, the beacon signal is not being transmitted over sectors $\beta$ or $\alpha$.

In accordance with another embodiment, the apparatus comprises beacon signal logic configured to randomly or pseudo-randomly allocate beacon signal time slots to the first sector $\alpha$, the second sector $\beta$ and the third sector $\gamma$, and a transmitter that transmits beacon signals on a first beacon signal frequency $f_1$ over the first sector $\alpha$, the second sector $\beta$ and the third sector $\gamma$ during respective time slots allocated to the respective sectors.

The present invention also provides a method for allocating beacon signals. In accordance with one embodiment, the method comprises allocating at least a first beacon signal time slot $t_1$ to at least the first sector $\alpha$, and transmitting a first beacon signal on a first beacon signal frequency $f_1$ over the first sector $\alpha$ during the first beacon signal time slot $t_1$.

In accordance with another embodiment, the method comprises allocating at least a first beacon signal time slot $t_1$ to the first sector $\alpha$, a second beacon signal time slot $t_2$ to the second sector $\beta$, and a third beacon signal time slot $t_3$ to the third sector $\gamma$, and transmitting a first beacon signal on a first beacon signal frequency $f_1$ over the first sector a during time slot $t_1$, a second beacon signal on the first beacon signal frequency $f_1$ over the second sector $\beta$ during the second time slot $t_2$, and a third beacon signal on the first beacon signal frequency $f_1$ over the first sector $\gamma$ during the third time slot $t_3$. Time slot $t_2$ occurs later in time than time slot $t_1$ and time slot $t_3$ occurs later in time than time slot $t_2$.

In accordance with another embodiment, the method comprises sequentially allocating beacon signal time slots to the first sector $\alpha$, the second sector $\beta$ and the third sector $\gamma$, and transmitting beacon signals on a first beacon signal frequency $f_1$ over the first sector $\alpha$, the second sector $\beta$ and the third sector $\gamma$ during respective time slots. When the beacon signal is being transmitted over sector $\alpha$, the beacon signal is not being transmitted over sectors $\beta$ or $\gamma$. When the beacon signal is being transmitted over sector $\beta$, the beacon signal is not being transmitted over sectors $\alpha$ or $\gamma$. When the beacon signal is being transmitted over sector $\gamma$, the beacon signal is not being transmitted over sectors $\beta$ or $\alpha$.

In accordance with another embodiment, the method comprises randomly or pseudo-randomly allocating beacon signal time slots to the first sector $\alpha$, the second sector $\beta$ and the third sector $\gamma$, and transmitting beacon signals on a first beacon signal frequency $f_1$ over the first sector $\alpha$, the second sector $\beta$ and the third sector $\gamma$ during respective time slots allocated to the respective sectors.

The present invention also provides a computer program for allocating beacon signals. In accordance with one embodiment, the program comprises a first code segment for allocating at least a first beacon signal time slot, $t_1$, to at least the first sector $\alpha$, and a second code segment for causing a first beacon signal to be transmitted on a first beacon signal frequency, $f_1$, over the first sector $\alpha$ during the first beacon signal time slot $t_1$.

In accordance with another embodiment, the program comprises a first code segment for allocating at least a first beacon signal time slot $t_1$ to the first sector α, a second beacon signal time slot $t_2$ to the second sector β, and a third beacon signal time slot $t_3$ to the third sector γ, and a second code segment for causing a first beacon signal to be transmitted on a first beacon signal frequency $f_1$ over the first sector α during time slot $t_1$, a second beacon signal to be transmitted on the first beacon signal frequency $f_1$ over the second sector β during the second time slot $t_2$, and a third beacon signal to be transmitted on the first beacon signal frequency $f_1$ over the first sector γ during the third time slot $t_3$. Time slot $t_2$ occurs later in time than time slot $t_1$ and time slot $t_3$ occurs later in time than time slot $t_2$.

These and other features and advantages of the invention will become apparent from the following description, drawings and claims.

BRIEF DESCRIPTION OF THE DRAWINGS

FIG. 7 illustrates a timing chart that demonstrates an example of the manner in which three frames of beacon signals are transmitted sequentially over three different sectors of a cell site using the same frequency in accordance with the invention.

FIG. 8 illustrates a timing chart that demonstrates an example of the manner in which three frames of beacon signals are transmitted randomly over three different sectors of a cell site using the same frequency in accordance with the invention.

DETAILED DESCRIPTION OF THE EXEMPLARY EMBODIMENTS

Figure 4:
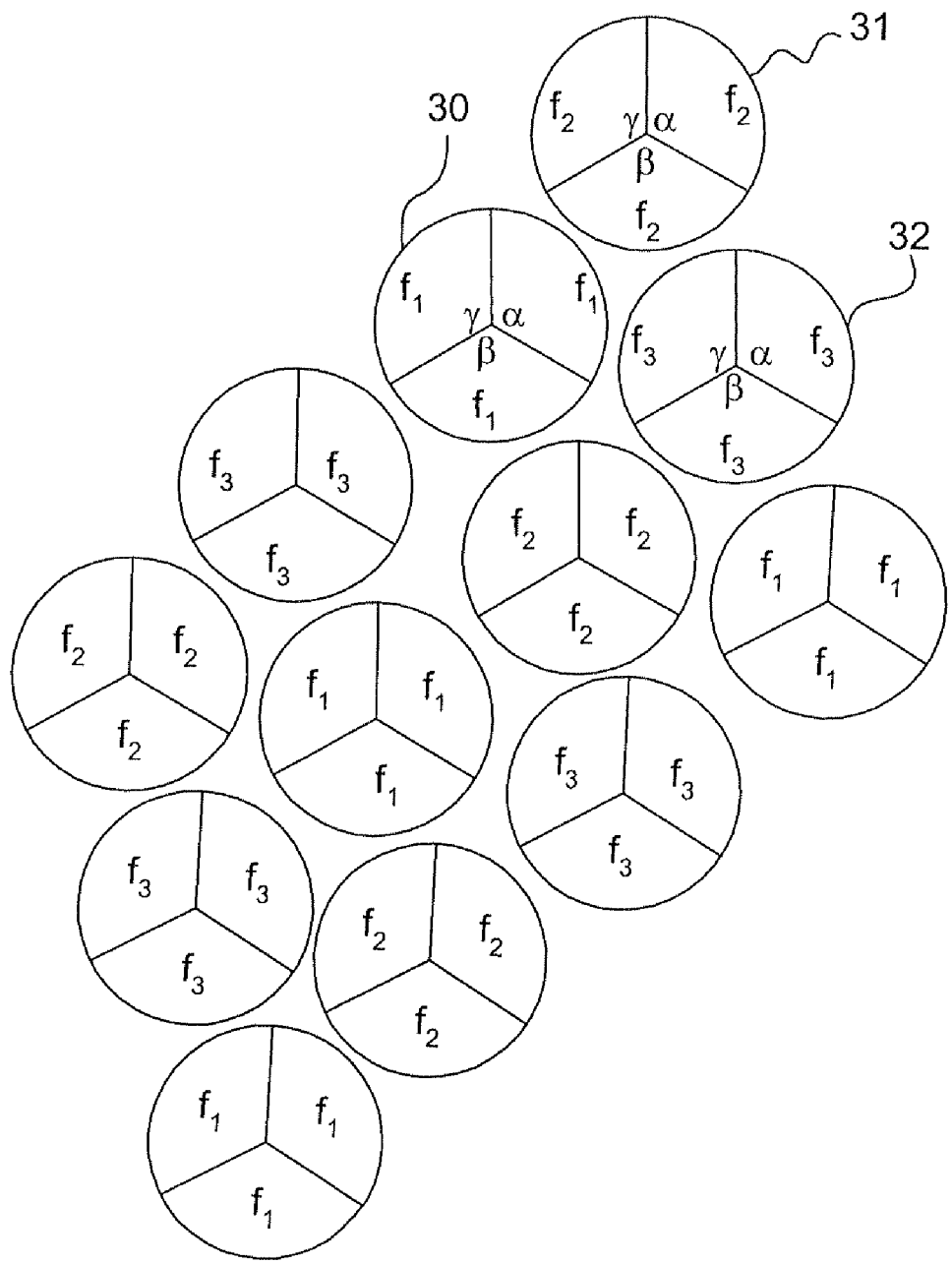
FIG. 4 illustrates a pictorial diagram of a plurality of cell sites, each of which is divided into three sectors, α, β and γ, with all of the sectors of a given cell site using the same frequency for the beacon signal.

In accordance with the preferred embodiment of the present invention, a single frequency is allocated for the beacon signal for each cell site. FIG. 4 is a diagram of a plurality of cell sites, each of which is divided into three sectors, α, β and γ, with all of the sectors of a given cell site using the same frequency for the beacon signal for that site. This diagram represents an example of the manner in which frequencies can be allocated in accordance with the method of the invention. The beacon signal allocation configuration represented by the diagram shown in FIG. 4 is a 1/3 beacon signal frequency allocation scheme, where X=1 corresponds to the number of cell sites that use a given frequency for the beacon signal and Y=3 corresponds to the total number of frequencies used for the beacon signals for the network.

Figure 3:
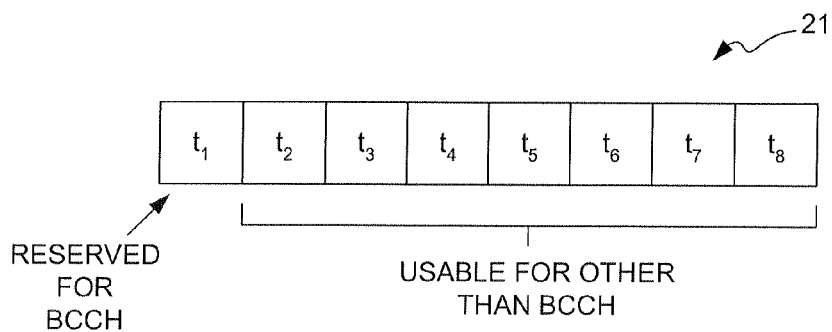
FIG. 3 illustrates a BCCH frame having eight time slots, wherein the first time slot is used for beacon signal transmission.

It should be noted that the invention is not limited to the 1/3 beacon signal frequency allocation scheme shown in FIG. 3. Other allocation schemes may be used, such as, for example, 1/4, 4/12, 7/21 and 5/15. For ease of discussion and illustration, the invention will be described only with reference to a 1/3 beacon signal frequency allocation scheme. Those skilled in the art will understand, in view of the description provided herein, the manner in which other beacon signal frequency allocation schemes can be achieved using the concepts and principles of the invention.

Figure 1:
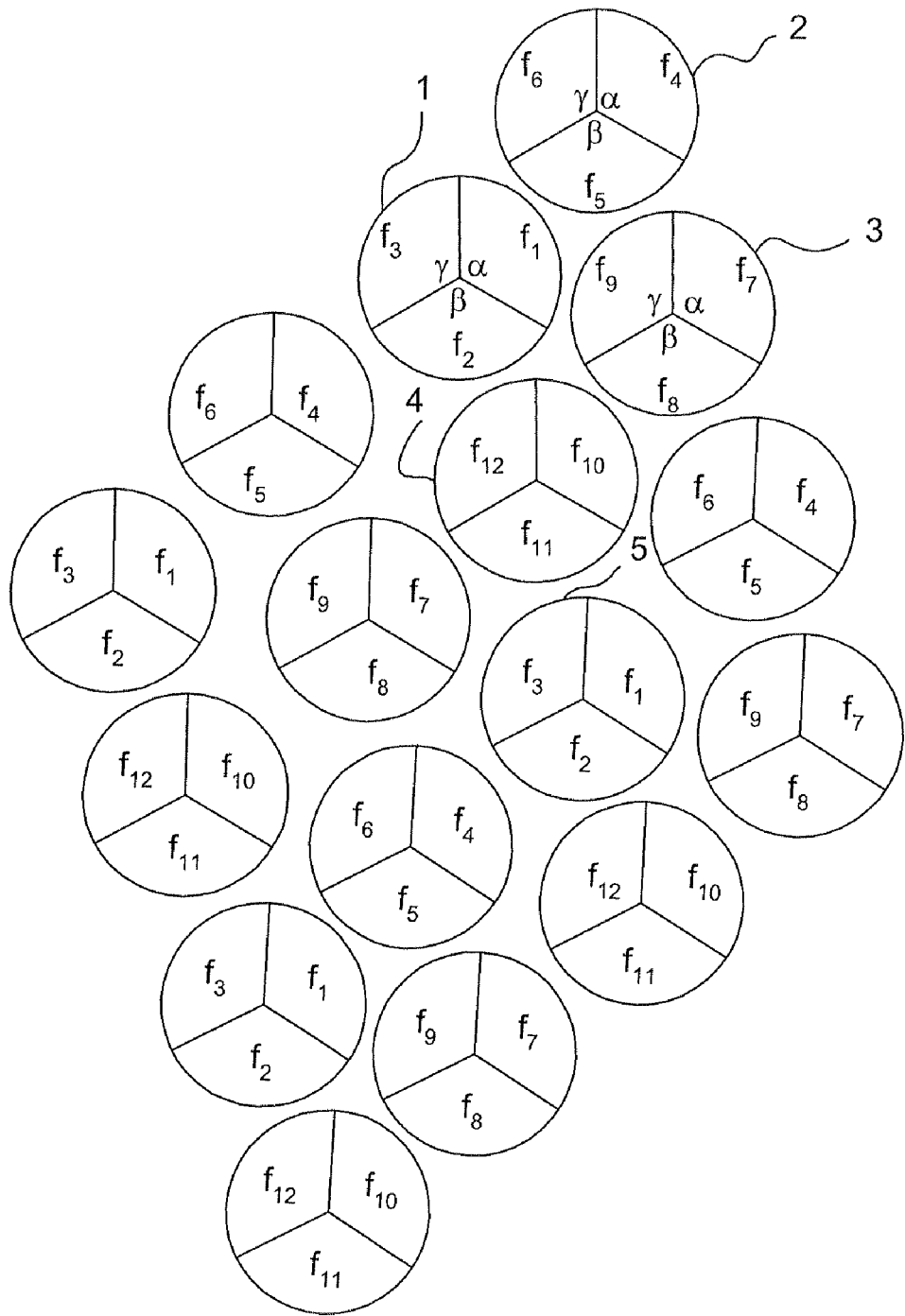
FIG. 1 illustrates a diagram of a plurality of cell sites, each of which is divided into three sectors with each sector of a given cell site using a different frequency.

As shown in FIG. 4, all of the sectors in the same cell site use the same frequency for the beacon signals. For example, sectors α, β and γ in cell site 30 all use frequency $f_1$ for the beacon signals. Likewise, sectors α, β and γ in cell site 31 all use frequency $f_2$ for the beacon signals. Likewise, sectors α, β and γ in cell site 32 all use frequency $f_3$ for the beacon signals. This is in contrast to the known beacon signal frequency allocation scheme shown in FIG. 1 in which each sector in the same cell site uses a different frequency for the beacon signals. Consequently, in accordance with the invention, a lesser number of frequencies need to be reserved for the beacon signals, which means that more frequencies are available for other purposes, such as for caller traffic, for example. Thus, the beacon signal frequency allocation method of the invention results in improved spectral efficiency.

Furthermore, as described below in detail, in accordance with the invention, the beacon signals do not have to be continuously broadcast, which results in improved power consumption efficiency over the current scheme as well as less adjacent channel and/or co-channel interference. In addition, because the beacon signals do not have to be broadcast continuously, when a time slot (e.g., $t_1$) is not being used to broadcast a beacon signal, that time slot can be used for transmitting caller traffic or for other purposes, which also improves spectral efficiency.

Figure 5:
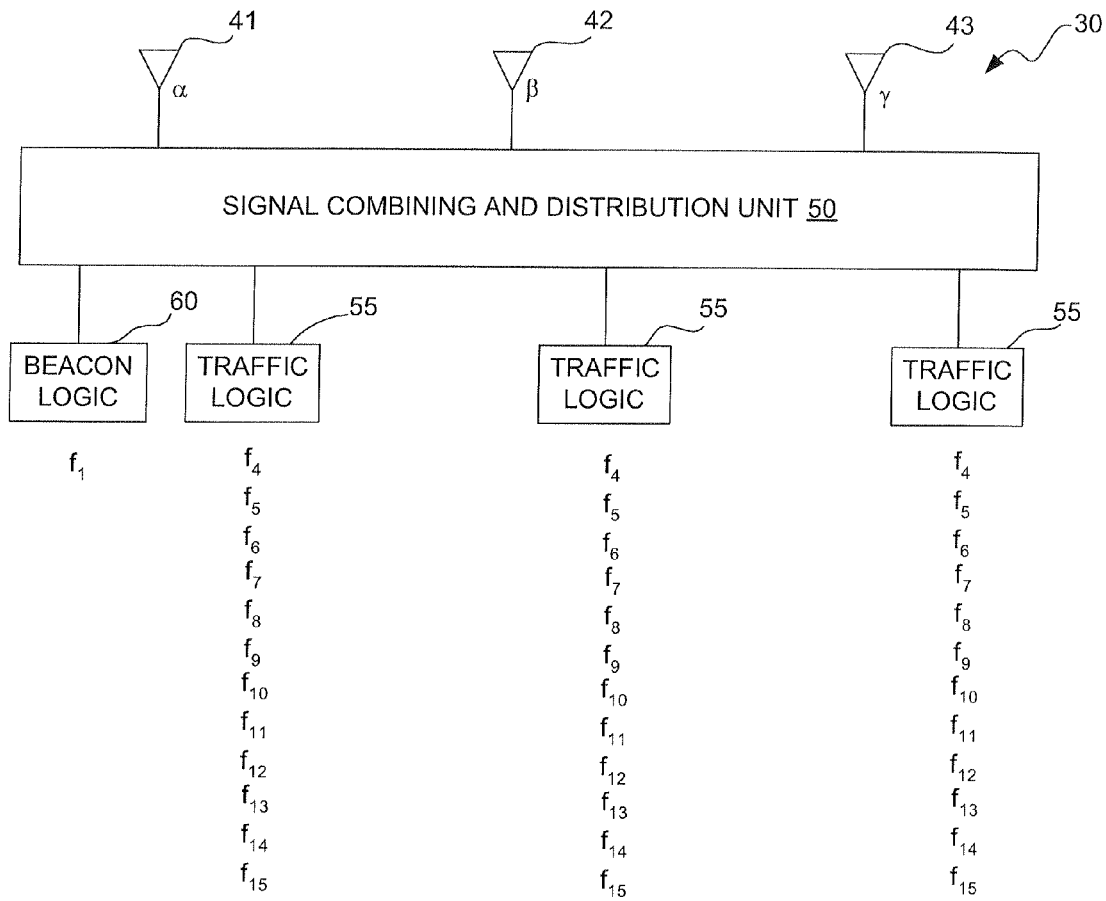
FIG. 5 illustrates a functional block diagram of one of the cell sites shown in the diagram of FIG. 4.

FIG. 5 is a functional block diagram of cell site 30 shown in the diagram of FIG. 4. The cell site 30 includes beacon logic 60 configured to generate beacon signals. The beacon logic 60 may be configured to generate BCCH signals that include a beacon signal that is transmitted in a BCCH time slot (e.g., time slot $t_1$) using frequency $f_1$. However, it should be noted that it is not necessary that the beacon signals be transmitted in a BCCH time slot. The cell site 30 also includes network traffic logic 55 configured to generate user signals, i.e., caller traffic, which may include voice or data signals. The signals generated by logic components 55 and 60 are combined and distributed to antennas 41, 42 and 43 by signal combining and distributing unit 50. A known signal combining and distributing unit, such as that shown in FIG. 2, for example, may be used for this purpose. The signals are then broadcast over the respective α, β and γ sectors by the respective sector antennas 41, 42 and 43.

In the cell site configuration shown in FIG. 5, directional antennas 41, 42 and 43 are used to transmit the respective signals over the respective sectors with high directionality to prevent or reduce interference between signals transmitted over adjacent sectors. Such a directional configuration reduces the likelihood of adjacent channel interference and co-channel interference. The manner in which this is accomplished is described below in detail with reference to FIGS. 6-8. It should be noted that the invention does not require that directional antennas be used for the sectors of the cell sites. A single omni-directional antenna could be used for each cell site.

In the exemplary embodiment shown in FIG. 5, it is assumed that a total of fifteen frequencies are available for use as beacon signal frequencies and user traffic frequencies. Only frequency $f_1$ is used for the beacon signal for cell site 30. Therefore, in this example, fourteen frequencies, namely frequencies $f_2$ through $f_{15}$, are available for use for caller traffic. For exemplary purposes, the traffic logic 55 is shown as using these fourteen frequencies for caller traffic, although a greater or lesser number of frequencies may be used for this purpose in accordance with the invention. The invention is not limited with respect to the number of beacon signal frequencies or user signal frequencies that are used. The invention also is not limited to any particular number of sectors per cell site.

Figure 2:
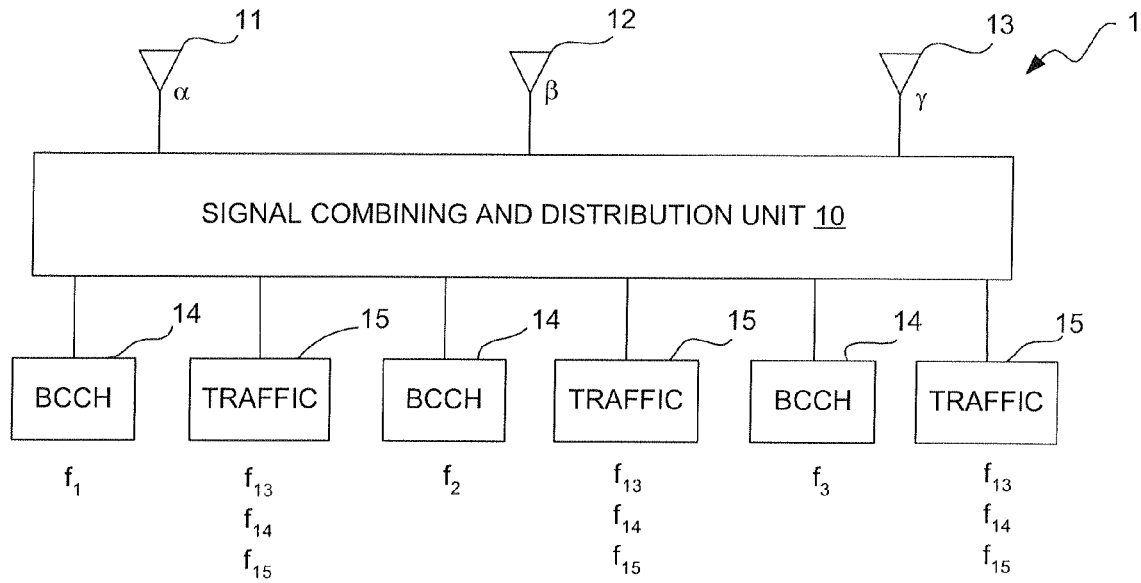
FIG. 2 illustrates a functional block diagram of one of the cell sites shown in FIG. 1.

It can be seen from a comparison of FIGS. 2 and 5 that frequencies $f_2$ through $f_{12}$, which are used as beacon signal frequencies by cell site 1 shown in FIG. 2, are available for use as caller traffic frequencies by cell site 30 of the invention shown in FIG. 5. This is because, in accordance with the invention, a single frequency (e.g., $f_1$) is used for the beacon signals for all of the sectors of the cell site 30. Cell sites 31 and 32 shown in FIG. 4 may have configurations that are identical to the configuration for cell site 30 shown in FIG. 5. Cell sites 31 and 32 use frequencies $f_2$ and $f_3$, respectively, for the beacon signals. Therefore, cell sites 31, 32 and 33 each may use frequencies $f_4$ through $f_{15}$ for caller traffic. This is a very large improvement in spectral efficiency over the known frequency allocation scheme represented by FIG. 1 in which frequencies $f_1$ through $f_{12}$ are used for the beacon signals.

Figure 6:
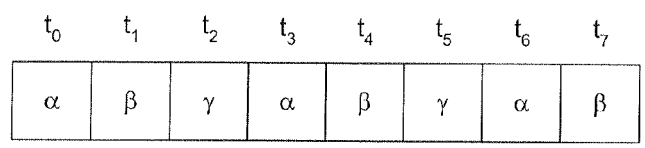
FIG. 6 illustrates the distribution of beacon signals to sectors α, β and γ of one of the cell sites shown in FIG. 5.

In accordance with the invention, beacon signals of a cell site use the same frequency and are distributed to the different sectors of the cell site in different time slots. Because a beacon signal is only transmitted to one sector at any given time, co-channel and adjacent channel interference are reduced for both BCCH carriers and traffic carriers. FIG. 6 illustrates the distribution of beacon signals to sectors α, β and γ of cell site 30 shown in FIG. 5. All of the sectors of cell site 30 use frequency $f_1$ for the beacon signals. As shown in FIG. 6, the beacon signal for sector α is transmitted during time slot $t_0$. The beacon signal for sector β is transmitted during time slot $t_1$. The beacon signal for sector γ is transmitted during time slot $t_2$. The beacon signals may then repeat. For example, the beacon signals for sectors α, β and γ may be retransmitted in time slots $t_3$, $t_4$ and $t_5$, respectively, and so on. The beacon logic 60 (FIG. 5) controls the time slot allocation and the timing of transmission of the beacon signals. Because the beacon signals for different sectors of a given cell site are transmitted at different times, the possibility of interference between the beacon signals for different sectors of the same cell is reduced or eliminated.

In accordance with the preferred embodiment, the beacon signals for different sectors of the same cell site are differentiated from each other by assigning them different sector identifiers (sector IDs). For example, each of the beacon signals for sectors α, β and γ of cell site 30 is transmitted along with a respective sector ID. Each cell site is assigned a cell site ID that preferably is transmitted along with the beacon signal, although it could be transmitted separate from the beacon signal. The mobile devices use the sector IDs to differentiate between the beacon signals of the different sectors. The present invention is also consistent with e-location or E-911 solutions commonly used to allow mobile devices to be located within a particular sector of a particular cell site.

Preferably, frequency hopping is used to transmit caller traffic. For example, when caller traffic is being transmitted by antenna 41 (FIG. 5) over sector α using frequency $f_4$ during a time slot $t_0$, caller traffic is not being transmitted over sectors β and γ using the same frequency $f_4$ in the same time slot $t_0$. Instead, during time slot $t_0$, caller traffic may be transmitted over sectors β and γ using frequencies $f_5$ and $f_6$, respectively. Then, when caller traffic is being transmitted over sector β using frequency $f_5$ during time slot $t_1$, for example, caller traffic may be transmitted over sectors α and γ during time slot $t_1$ using frequencies $f_4$ and $f_6$, respectively. This frequency hopping technique is generally the same as that described above for the known configuration shown in FIG. 2.

The frequencies that are used for caller traffic ($f_4$-$f_{15}$) may be placed in a pool for use by all of the cell sites. In the case where the caller traffic frequencies are placed in a pool and used by all of the cell sites, the frequencies are allocated to time slots in a manner that prevents or reduces adjacent channel and co-channel interference. Alternatively, the frequencies may be divided into groups for different cell sites. For example, frequencies $f_4$-$f_7$ may be allocated to cell site 30, frequencies $f_5$-$f_{11}$ may be allocated to cell site 31, and frequencies $f_{12}$ $f_{15}$ may be allocated to cell site 32.

It should be noted that when respective directional antennas are used for the respective sectors of a given cell site, it is not always necessary to use frequency hopping because the directionality of the antennas may be sufficient to prevent interference between the user signals transmitted using the same frequencies in sectors of the same cell site.

Preferably, beacon signal hopping in the time domain is used to transmit the beacon signals over different sectors of a cell site using the same frequency. This can be seen from the timing chart shown in FIG. 7, which demonstrates an example of the manner in which three frames of beacon signals are transmitted sequentially over three different sectors of a cell site using the same frequency in accordance with the invention. In accordance with this example, each beacon signal is made up of eight time slots, $t_0$ through $t_7$. In time slots $t_0$, $t_1$ and $t_2$, the following occurs: the beacon signals corresponding to frame 1 are transmitted over sectors α, β and γ, respectively; the beacon signals corresponding to frame 2 are transmitted over sectors γ, α and β, respectively; and the beacon signals corresponding to frame 3 are transmitted over sectors β, γ and α, respectively. Transmission over the sectors is then repeated in the same sequence for the next three time slots. Specifically, in time slots $t_3$, $t_4$ and $t_5$, the following occurs: the beacon signals corresponding to frame 1 are transmitted over sectors α, β and γ, respectively; the beacon signals corresponding to frame 2 are transmitted over sectors γ, α and β, respectively; and the beacon signals corresponding to frame 3 are transmitted over sectors β, γ and α, respectively. Likewise, in time slots $t_6$, $t_7$ and $t_8$, the following occurs: the beacon signals corresponding to frame 1 are transmitted over sectors α, β and γ, respectively; the beacon signals corresponding to frame 2 are transmitted over sectors γ, α and β, respectively; and the beacon signals corresponding to frame 3 are transmitted over sectors β, γ and α, respectively.

In synchronized networks it is preferable to use the sequential beacon signal hopping method described above with reference to FIG. 7 because sequential beacon signal hopping in such cases will significantly reduce adjacent channel and co-channel interference. Synchronized networks are networks in which all like sectors for all cell sites are transmitted simultaneously (e.g., all α sectors for all cell sites are transmitted simultaneously, all β sectors for all cell sites are transmitted simultaneously, and all γ sectors are transmitted simultaneously). With the sequential hopping pattern shown in FIG. 7, the beacon signal is transmitted to each sector the same number of times over any multiple of 3×N time slots, where N is a positive integer. For each frame, the beacon signal for each sector is activated two to three times. Allocating the beacon signals generally evenly among the sectors ensures that mobile devices will be able to detect the beacon signals.

In networks that are not synchronized (i.e., networks in which like sectors are not transmitted simultaneously), it may be preferably to use time domain random beacon signal hopping, as demonstrated by the timing chart shown in FIG. 8. Random beacon signal hopping in the time domain will generally result in reduced adjacent channel and co-channel interference as well as improved interference diversity gain. As shown in FIG. 8, for each frame, the order in which the sectors are transmitted is not sequential. Rather, the order is random. For example, for the beacon signal corresponding to frame 1, sectors α, β and γ are transmitted in time slots $t_0$, $t_1$ and $t_2$, respectively, but sectors β, α and γ are transmitted in time slots $t_3$, $t_4$ and $t_5$, respectively. It should be noted, however, that no sector is transmitted for any of the frames more than once in any given time slot.

Beacon signal time domain hopping patterns other than those shown in FIGS. 7 and 8 may also be used. In some cases, it may be desirable to allocate the beacon signals for the different sectors unevenly, such as in cases where the traffic load is heavier in some sectors than in others. In such cases, the sectors that are experiencing heavier traffic may be allocated more beacon signal time slots whereas sectors that are experiencing lighter traffic may be allocated less beacon signal time slots. This feature of the present invention provides for traffic load balancing in the network. In addition, this feature allows time slots that are not being used for transmission of the beacon signal to be used for other purposes, such as for caller traffic.

Furthermore, if most or all of the time slots for a given frequency are reserved for the beacon signal, it is not necessary for the beacon signal to be transmitted at constant power because the beacon signal is being transmitted with sufficient frequency to be detected by mobile devices even at reduced power levels. For example, for every four beacon signals transmitted to sector α of a given cell site, the first beacon signal may be transmitted at maximum power, the second beacon signal at a power level that is 2 decibels (dB) below the power level of the first beacon signal, the third beacon signal at a power level that is 2 dB below the power level of the second beacon signal, and the fourth beacon signal at a power level that is 2 dB below the power level of the third beacon signal. Therefore, the present invention allows power consumption to be controlled. This is in contrast to the known beacon signal frequency allocation scheme, which keeps the beacon signals continuously activated at constant power.

It can be seen from the foregoing that the invention provides several advantages over the known beacon signal frequency allocation technique, including, for example, simplified frequency reuse planning, improved spectral efficiency, reduced adjacent channel and co-channel interference, and control over power consumption.

Figure 9:
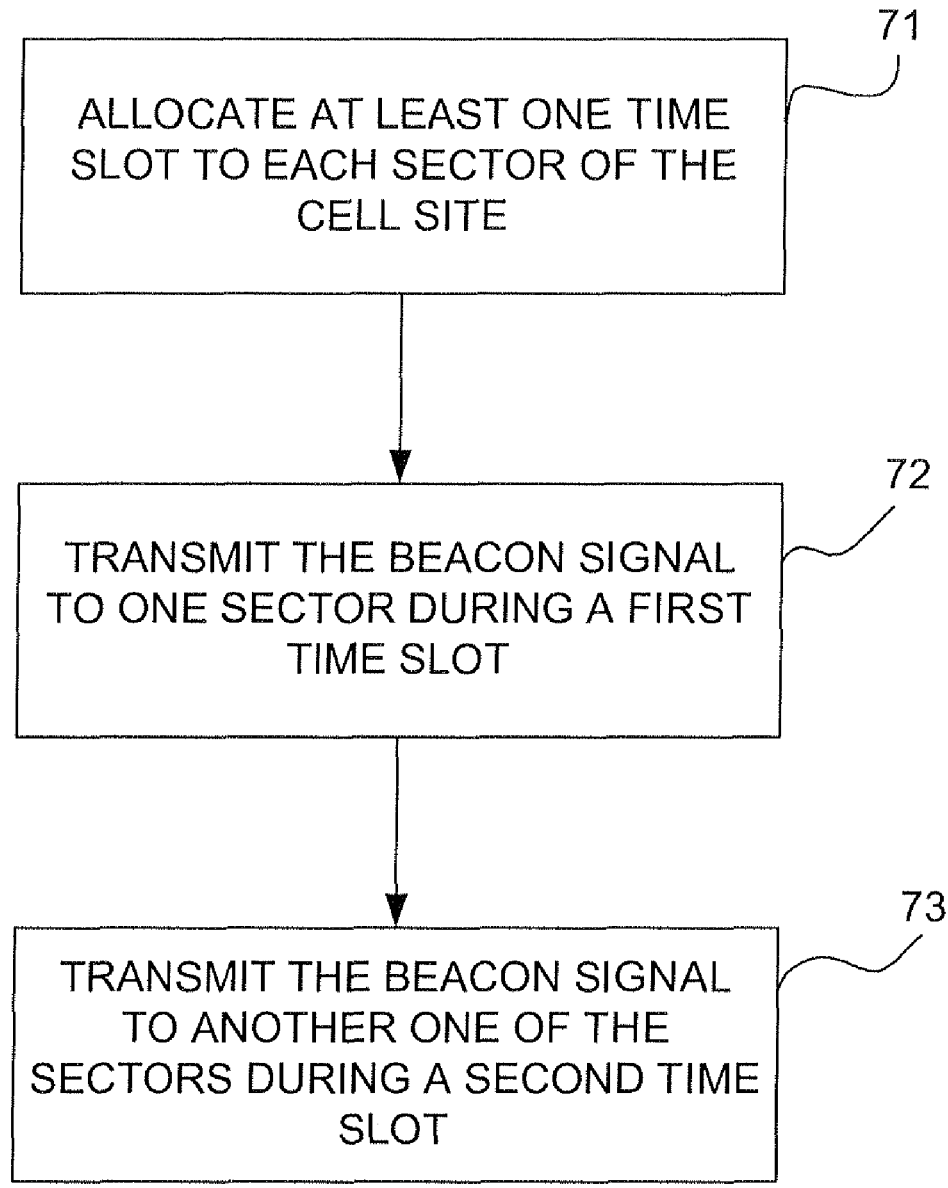
FIG. 9 illustrates a flow chart describing the method of the present invention in accordance with an exemplary embodiment.

FIG. 9 illustrates a flow chart of the method of the invention in accordance with the preferred embodiment for performing beacon signal hopping in the time domain in a given cell site having multiple sectors. For this example, it will be assumed that each cell site is divided into at least first and second sectors and that at least one beacon signal time slot is allocated to each sector. First, time slots of the beacon signal are allocated to one or more sectors of the cell site, as indicated by block 71. It will be assumed for exemplary purposes that each sector is allocated at least one beacon signal time slot, although this is not necessary to the invention. As described above, it may be desirable to allocate more time slots to certain sectors than to others. Next, the beacon signal is transmitted to one of the sectors during time slot $t_1$, as indicated by block 72. Next, the beacon signal is transmitted to the other of the sectors in time slot $t_2$, as indicated by block 73. Time slot $t_2$ occurs later in time than time slot $t_1$, but does not necessarily immediately follow time slot $t_1$ in time.

Figure 10:
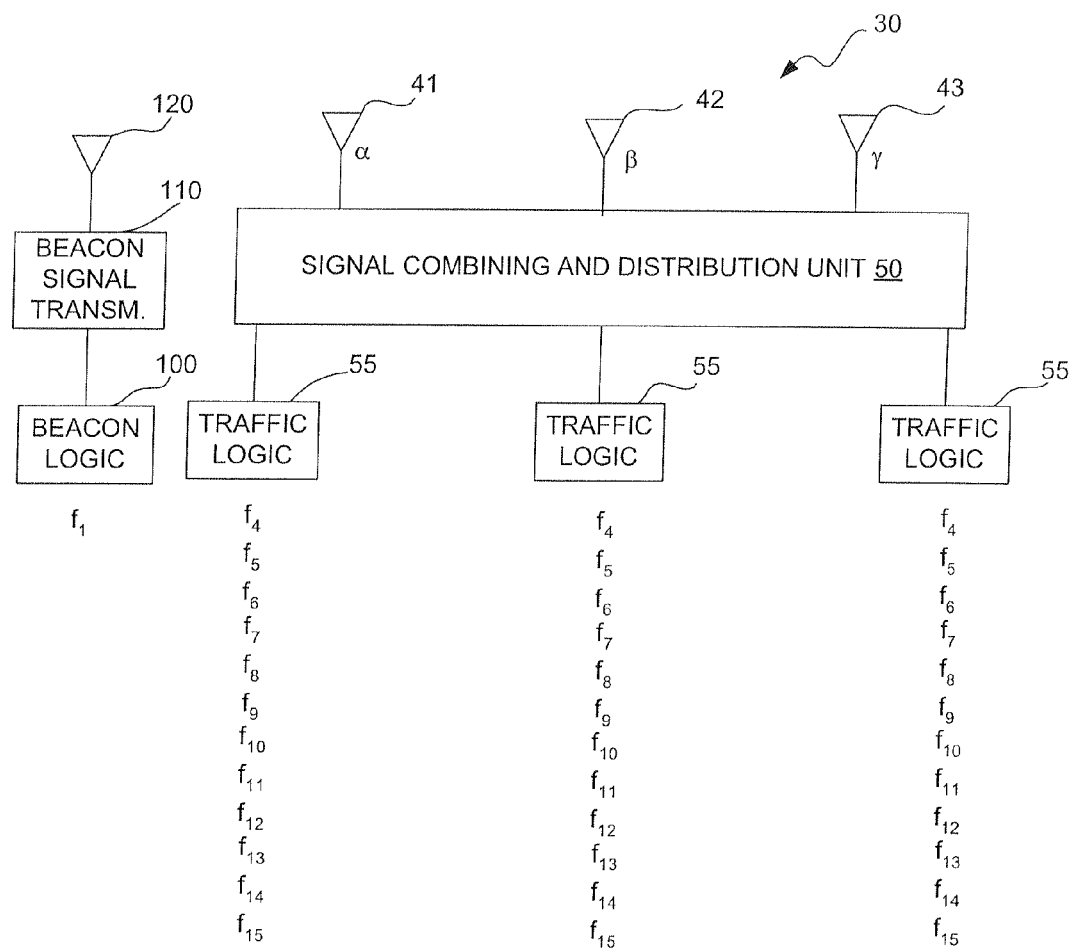
FIG. 10 shows an alternative embodiment of cell site 30 shown in FIG. 4 that enables the beacon signal to bypass the combining and distribution unit.

With reference again to FIG. 5, the beacon signal logic 60 is shown being coupled to the signal combining and distribution unit 50, which combines the beacon signal with the traffic signal for transmission over the corresponding one of the sector antennas 41, 42 or 43. It is not necessary for the beacon signal to be combined with the traffic signal. FIG. 10 shows an alternative embodiment of cell site 30 that enables the beacon signal to bypass the combining and distribution unit 50. The embodiment shown in FIG. 10 is essentially identical to the embodiment shown in FIG. 5 except that the beacon logic 100 is coupled to a separate beacon signal transmitter 110 and a three panel directional antenna 120 having panels pointed at sectors α, β and γ. The cell site 30 represented by the block diagram of FIG. 10 performs the same functions as those performed by the cell site 30 represented by the block diagram of FIG. 5. Therefore, the components shown in FIG. 10 as having the same reference number as components shown in FIG. 5 will not be described.

It should be noted that while the present invention has been described with reference to certain exemplary embodiments, the present invention is not limited to the embodiments described herein. For example, FIG. 5 shows respective directional antennas being used for respective time slots. A single omni-directional antenna may be used for transmission of the beacon signals over all of the sectors of the cell site, although it is preferred to use respective directional antennas for the respective cell site sectors. Also, a dedicated antenna may be used for the beacon signals so that the beacon signals would not have to be combined and distributed by the combining and distribution unit 50 (FIG. 5). It should also be noted that although a single frequency may be used for the beacon signals for all of the sectors of a cell site, it is not necessary that a single frequency be used. The time domain beacon signal hopping method of the invention also applies to cases where multiple frequencies are used for different sectors of a cell site. Other modifications may be made to the embodiments described herein and all such modifications are within the scope of the invention.

What is claimed is:
1. An apparatus for transmitting beacon signals over a cell site of a wireless communications network, the cell site being divided into at least a first sector, a second sector, and a third sector, the apparatus comprising:
   beacon signal logic configured to randomly allocate beacon signal time slots to the first sector, the second sector, and the third sector;
   a transmitter configured to transmit the beacon signals on a first beacon signal frequency, over the first sector, the second sector, and the third sector during time slots allocated to the sectors, wherein each of the sectors has a respective time slot; and
   a combination and distribution unit configured to combine the beacon signals carried on the first beacon signal frequency with a caller traffic signal carried on a carrier frequency, wherein the transmitter is configured to transmit the beacon signals with the caller traffic signal over the sectors of the cell site and wherein the transmitter is further configured to cycle a power level of the beacon signals to the sectors.

2. The apparatus of claim 1, wherein in response to the beacon signal being transmitted over the first sector, the beacon signal is not transmitted over the second and third sectors, and in response to the beacon signal being transmitted over the second sector, the beacon signal is not transmitted over the first and third sectors, and in response to the beacon signal being transmitted over the third sector, the beacon signal is not transmitted over the first and second sectors.

3. The apparatus of claim 1, wherein the transmitter is further configured to transmit the beacon signals on a second beacon signal frequency.

4. The apparatus of claim 1, wherein the carrier frequency is selected from a pool of carrier frequencies.

5. The apparatus of claim 4, wherein the pool of carrier frequencies is divided based on the cell site.

6. A method for transmitting beacon signals over a cell site of a wireless communications network, the cell site being divided into at least a first sector, a second sector, and a third sector, the method comprising:
    randomly allocating beacon signal time slots to the first sector, the second sector, and the third sector;
    transmitting the beacon signals on a first beacon signal frequency over the first sector, the second sector, and the third sector during time slots allocated to the sectors wherein each of the sectors has a respective time slot; and
    combining the beacon signals carried on the first beacon signal frequency with a caller traffic signal carried on a carrier frequency, and wherein the transmitting further comprises transmitting the respective beacon signals with the caller traffic signal over the sectors of the cell sites wherein the transmitting is further comprise cycling a power level of the beacon signals to the sectors.

7. The method of claim 6, wherein the transmitting the beacon signals further comprises transmitting the first beacon signal frequency to the first sector, the second sector, and the third sector one at a time.

8. The method of claim 6, wherein the transmitting the beacons signals further comprises transmitting the beacon signals on a second beacon signal frequency.

9. The method of claim 6, wherein the transmitting the beacons signals further comprises transmitting the beacon signals on a third beacon signal frequency.

10. The method of claim 6, wherein the combining the beacon signals further comprises combining the beacon signals carried on the first beacon signal frequency with the traffic signal being carried on a carrier frequency selected from a pool of carrier frequencies.

11. An apparatus that transmits beacon signals over a cell site of a wireless communications network, the cell site being divided into at least a first sector, a second sector, and a third sector, the apparatus comprising:
    beacon signal logic configured to allocate beacon signal time slots to the first sector, the second sector, and the third sector based on a load of each of the sectors, wherein a sector with a load higher than another load of another sector is allocated more beacon signal timeslots than the other sector;
    a transmitter configured to transmit the beacon signals on a first beacon signal frequency over the first sector, the second sector, and the third sector during time slots allocated to the sectors, wherein each of the sectors has a respective time slot; and
    a combination and distribution unit configured to combine the beacon signals carried on the first beacon signal frequency with a caller traffic signal carried on a carrier frequency, wherein the transmitter is configured to transmit the beacon signals with the caller traffic signal over the sectors of the cell site.

12. The apparatus of claim 11, wherein the transmitter is further configured to cycle a power level of the beacon signals to the sectors.

13. The apparatus of claim 12, wherein the power level of the beacon signals to the sectors is reduced every iteration in a repeatable cycle.

* * * * *